United States Patent [19]

Shimamura

[11] Patent Number: 4,650,159

[45] Date of Patent: Mar. 17, 1987

[54] FLOW CONTROL DEVICE

[75] Inventor: Morihiko Shimamura, Higashimatsuyama, Japan

[73] Assignee: Jidosha Kiki Co., Ltd., Tokyo, Japan

[21] Appl. No.: 657,852

[22] Filed: Oct. 4, 1984

[30] Foreign Application Priority Data

Oct. 19, 1983 [JP] Japan .................. 58-161636[U]

[51] Int. Cl.$^4$ ............................. F16K 31/44
[52] U.S. Cl. .................... 251/263; 251/258; 251/129.11; 74/55; 137/596.17; 137/627.5
[58] Field of Search ............. 251/129.05, 129.08, 251/129.11, 129.2, 258, 260, 263; 137/596, 596.17, 627.5; 74/567, 569, 55

[56] References Cited

U.S. PATENT DOCUMENTS

| | | | |
|---|---|---|---|
| 715,009 | 12/1902 | Brindley | 137/627.5 |
| 3,408,041 | 10/1968 | Kraft | 251/260 |
| 3,478,782 | 11/1969 | Peeples | 137/627.5 |
| 3,793,894 | 2/1974 | Grekovics | 74/55 |
| 4,084,120 | 4/1978 | Lund | 137/596.17 |
| 4,412,517 | 11/1983 | Kobashi et al. | 251/129.11 |
| 4,459,945 | 7/1984 | Chatfield | 74/55 |

FOREIGN PATENT DOCUMENTS

| | | | |
|---|---|---|---|
| 278814 | 10/1914 | Fed. Rep. of Germany | 137/627.5 |
| 1750092 | 2/1980 | Fed. Rep. of Germany | 137/627.5 |
| 1235320 | 5/1960 | France | 137/627.5 |

Primary Examiner—Margaret A. Focarino
Assistant Examiner—Noah Kamen
Attorney, Agent, or Firm—Flynn, Thiel, Boutell & Tanis

[57] ABSTRACT

A flow control device for controlling the flow rate of fluid utilizes a stepping motor. A translating mechanism translates the rotation of the stepping motor into a rectilinear movement which causes a valve to move in either forward or backward direction, thereby controlling a clearance formed between the valve and its associated valve seat. A channel area is controlled in this manner, and a flow control over an extensive range from a minimal to maximal flow is achieved with a high accuracy and improved response.

3 Claims, 10 Drawing Figures

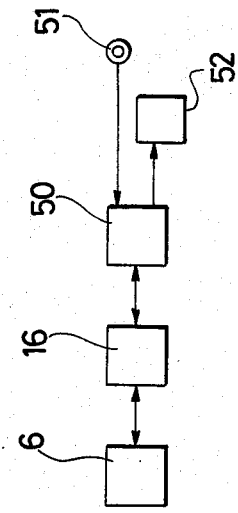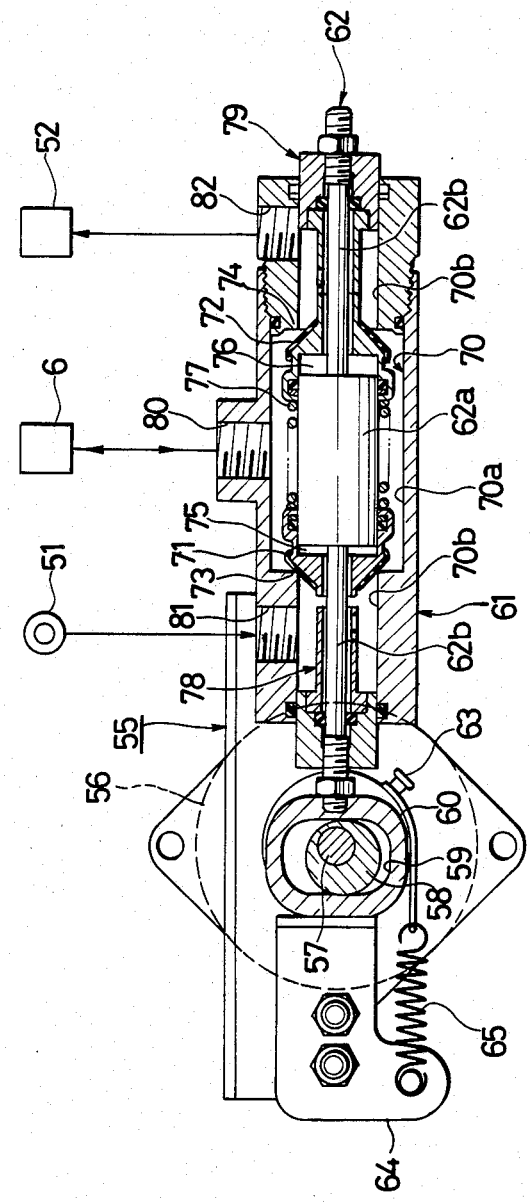

FLOW CONTROL DEVICE

FIELD OF THE INVENTION

The invention relates to a flow control device for controlling a flow rate of a fluid.

DESCRIPTION OF THE PRIOR ART

A variety of flow control devices have been proposed in the prior art. However, there is no flow control device in the prior art which is capable of controlling the flow rate over an extensive range from minimal to maximal flow with a high accuracy and improved response.

SUMMARY OF THE INVENTION

It is an object of the invention to enable a control of flow rate over an extensive range from a minimal to a high flow with a high accuracy and improved response.

The invention utilizes a stepping motor, and comprises a translating mechanism for translating the rotation of the stepping motor into a rectilinear movement, a valve associated with the translating mechanism for reciprocatory movement, a valve seat disposed opposite to the valve, and a flow path communicating through a clearance formed between the valve and the valve seat. In this manner, the flow rate of a fluid through the flow path is controlled by adjusting the clearance between the valve and the valve seat in accordance with the magnitude of rotation of the stepping motor. This enables a control of the flow rate over an extensive area from a minimal to a high flow with a high accuracy and improved response.

Above and other objects, features and advantages of the invention will become apparent from the following description of several embodiments thereof with reference to the attached drawings.

BRIEF DESCRIPTION OF THE DRAWINGS

FIG. 8 is a schematic diagram of a further embodiment of the invention;

FIG. 9 is a transverse cross section of a further embodiment of the invention.

DETAILED DESCRIPTION OF EMBODIMENTS

Figure 1:
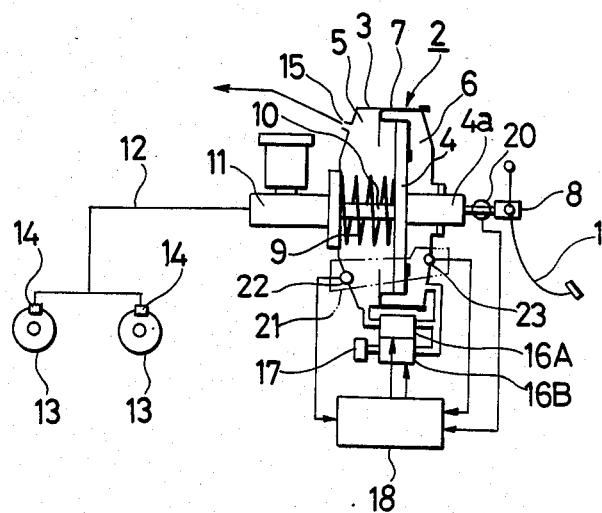
FIG. 1 is a schematic diagram of one embodiment of the invention.

FIG. 1 illustrates a control valve which controls the supply or drainage of hydraulic fluid to or from a booster mechanism which forms a brake booster and in which a pair of flow control devices according to one embodiment of the invention are employed.

Referring to FIG. 1, a brake pedal 1 is pivotally mounted on a carrosserie, not shown, and is mechanically associated with a booster mechanism 2 which operates to multiply the force of depression applied to the pedal. The booster mechanism 2 shown comprises a shell 3 which serves as an enclosed vessel, a power piston 4 disposed within the shell for reciprocatory motion, and a diaphragm 7 which serves in combination with the power piston 4 to divide the interior of the shell 3 into a pair of pressure chambers 5, 6.

The power piston 4 has a hollow cylindrical shank 4a which slidably extends through the shell 3 while maintaining a hermetic seal, and an input shaft 8 which has its front end pivotally connected with the power piston 4 is mechanically interlocked with the brake pedal 1. A return spring 9 normally maintains the power piston 4 in its retracted or non-operative position shown. The front side of the power piston 4 is fixedly connected with an output shaft 10 in an integral manner, and the output shaft 10 is mechanically associated with a master cylinder 11 which is mounted on the front side of the shell 3. A braking liquid pressure which is generated within the master cylinder 11 is transmitted through a conduit 12 to wheel cylinders 14 of wheels 13 for purpose of applying a braking action thereon.

In this embodiment, the forward pressure chamber 5 normally communicates with a source of negative pressure such as an intake manifold, not shown, through a negative pressure inlet pipe 15. It is to be noted that the forward pressure chamber 5 and the rearward pressure chamber 6 can communicate with each other though a first flow control device 16A which is constructed in accordance with the invention. In addition, it is to be noted that the rearward pressure chamber 6 can communicate with the atmosphere through a second flow control device 16B constructed in accordance with the invention and through an air cleaner 17. These flow control devices 16A and 16B have an area of flow path or channel area which is controlled by a controller 18 including a microcomputer, and provide a communication between the pair of pressure chambers 5, 6 when deenergized, and to interrupt the communication between the both chambers 5, 6 and to allow the rearward pressure chamber 6 to communicate with the atmosphere when energized.

It is to be noted that the input shaft 8 is provided with input detector means 20 such as load cell which permits the force of depression applied to the brake pedal 1 to be detected directly. The magnitude of an input detected by the input detector means 20 is supplied to the controller 18. Output detector means 21 which indirectly detects an output from the booster mechanism 2 is formed by a pair of pressure detectors 22, 23 which are disposed on the shell 3. The detector 22 detects the pressure within the forward pressure chamber 5 and the detector 23 detects the pressure within the rearward pressure chamber 6. Signals from the respective pressure detectors 22, 23 are also supplied to the controller 18.

The controller 18 receives a detection signal from the input detector means 20, and operates to calculate an output on the basis of the magnitude of such input and an input/output response which is stored previously in a memory. In this manner, the controller 18 controls the pair of flow control devices 16A, 16B so that the outputs from the output detector means 21 have values which correspond to the calculated output.

Figure 2:
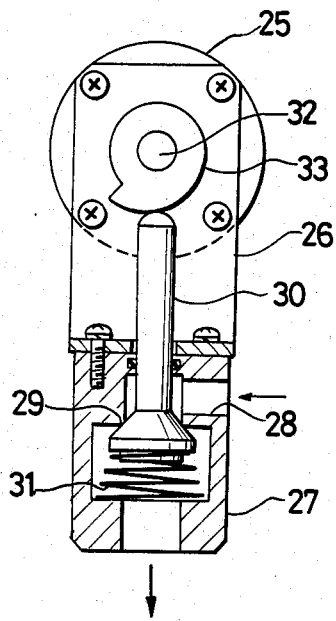
FIG. 2 is a schematic cross section of part of the embodiment shown in FIG. 1.
Figure 3:
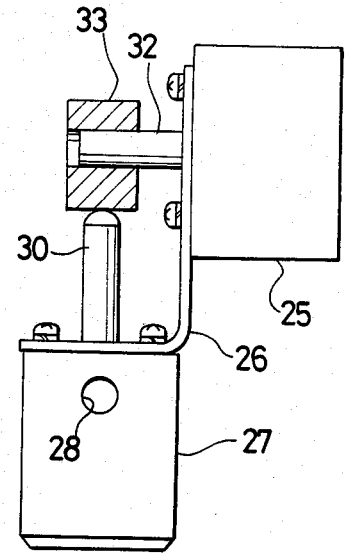
FIG. 3 is a side elevation of the part shown in FIG. 2.

It is to be understood that the pair of flow control devices 16A, 16B have an identical construction, which is specifically shown in FIGS. 2 and 3. In these Figures, the device includes a stepping motor 25 which is fixedly mounted on one limb of an L-shaped bracket 26, and also includes a housing 27 fixedly mounted on the other limb of the bracket 26 and in which a flow path 28 having a right angle bend is defined. A valve seat 29 is formed within the housing so as to surround the flow path 28, and a valve 30 which is slidably fitted in the housing 27 is seated upon the valve seat 29 under the resilience of a spring 31. The valve 30 includes a shank which projects externally of the housing 27 and which is disposed so that its axis is perpendicular to the axis of the rotating shaft 32 of the stepping motor 25. A cam 33 is fixedly mounted on the rotating shaft 32, and is abutted by the free end of the valve shank.

In the described arrangement, in its non-operative condition or when no force of depression is applied to the brake pedal 1, such condition is detected by the controller 18 through the input detector means 20, and the controller 18 controls the stepping motor 25 of the second flow control device 16B in a manner such that the valve 30 is seated upon the valve seat 29 to interrupt the communication between the pressure chamber 6 and the atmosphere, and also controls the stepping motor 25 of the first flow control device 16A in a manner such that the valve 30 is slightly spaced from the valve seat 29 to establish a communication between the both pressure chambers 5, 6, thus introducing a negative pressure into the both chambers. Under this condition, there is no difference in the hydraulic pressure across the power piston 4, which is therefore maintained in its non-operative position shown, by the return spring 9.

If the brake pedal 1 is now depressed to transmit a force of depression to the input shaft 8, such force is detected by the input detector means 20. In response thereto, the controller 18 closes the flow path of the first flow control device 16A to interrupt the communication between the both pressure chambers 5, 6, and also opens the flow path 28 of the second flow control device 16B to introduce the atmospheric pressure into the pressure chamber 6. This produces a difference in the hydraulic pressure across the power piston 4, which is therefore driven forward against the resilience of the return spring 9.

The difference in the hydraulic pressure across the power piston 4 is detected by the pair of pressure detectors 22, 23 which form the output detector means 21 together, and the controller 18 calculates an output on the basis of the detected difference from the both pressure detectors 22, 23. At the same time, the controller 18 calculates an output corresponding to the input, based upon the magnitude of the input detected by the input detector means 20 and the input/output response which is previously stored, and controls the opening of the second flow control device 16B so that the magnitude of the output detected by the output detector means 21 coincides with the calculated output.

More specifically, in the event there is a large difference between the input value and the output value, the controller 18 causes the stepping motor 25 of the second flow control device 16B to increase the channel area of the flow path 28. As the difference between the input and the output value decreases in response thereto, the controller 18 controls the stepping motor 25 so as to reduce the channel area.

When the output shaft 10 which is integral with the power piston 4 moves forward with an output which corresponds to the input, a braking liquid pressure is developed within the master cylinder 11 which is mechanically associated with the output shaft 10, and is supplied through the conduit 12 to the wheel cylinders 14 associated with the wheels 13, thus applying a braking action thereon.

On the other hand, when the force of depression applied to the input shaft 8 reduces, and accordingly the input value is reduced as compared with the output value, the controller 18 cuts the flow path of the second flow control device 16B off to interrupt communication between the pressure chamber 6 and the atmosphere. Simultaneously, it opens the flow path of the first flow control device 16A to permit a communication between the both pressure chambers 5, 6, thus introducing a negative pressure into chamber 6. Again, a difference between the input and the output value is detected, and the controller 18 controls the channel area of the first flow control device 16A in accordance with such difference.

As a consequence, the power piston 4 moves back, and ultimately it reaches its non-operative position where the braking action is released. Thereupon the controller 18 causes the valve 30 of the first flow control device 16A to be slightly spaced from the valve seat 29 to permit a communication between the both pressure chambers 5, 6, thus introducing a negative pressure into the both chambers.

It should be understood that in an alternative arrangement, the flow path of the first flow control device 16A may be completely closed when it is deenergized. Also, the path of the first flow control device 16A may be utilized to provide a direct communication between the pressure chamber 6 and a source of negative pressure rather than providing a communication between the both pressure chambers 5, 6. However, it is to be noted that an arrangement which provides a communication between the pressure chambers 5, 6 has an advantage that the atmospheric pressure which finds its way into the pressure chamber 5 from the pressure chamber 6 exerts a pressure on the power piston 4 to accelerate its rearward movement.

It should also be noted that the input and the output detector means are not limited to the construction mentioned above, and that various other constructions may be utilized. By way of example, the brake pedal may be utilized to actuate a hydraulic cylinder unit to produce an oil pressure in accordance with the force of depression, and the resulting oil pressure may be detected, thus providing the function of the input detector means. Similarly, the function of the output detector means may be served by the detection of a braking liquid pressure which is developed within the master cylinder or by detecting the magnitude of an output which is applied directly to the output shaft, as by load cell.

Figure 4:
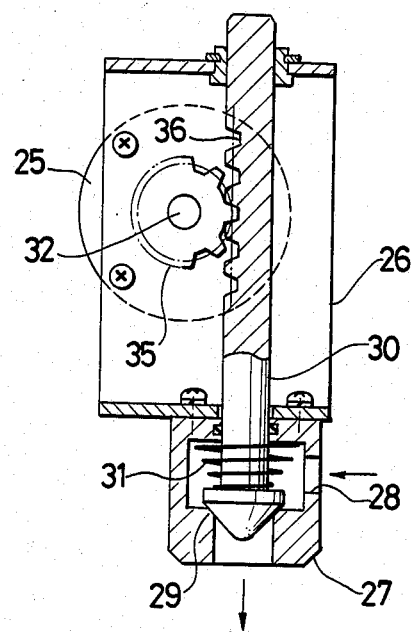
FIGS. 4 to 6 are cross sections of other embodiments of the invention.
Figure 5:
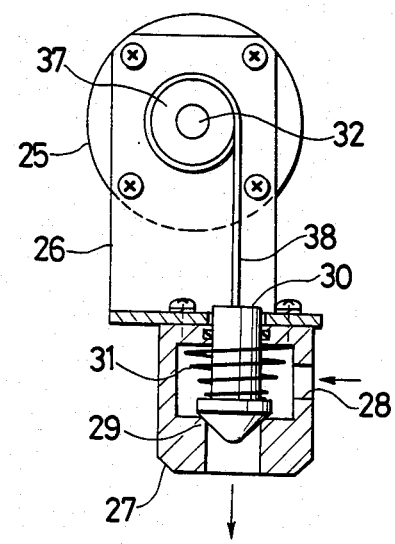
Figure 6:
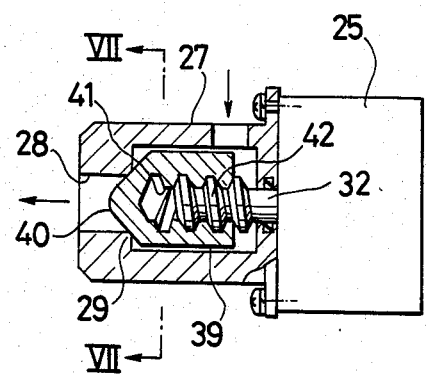

In the described arrangement, the cam 33 is used as a mechanism which translates the rotation of the stepping motor 25 into a rectilinear movement, but other suitable arrangements may also be employed. FIGS. 4 to 6 illustrate other arrangements for the translating mechanism. The translating mechanism shown in FIG. 4 comprises a pinion 35 fixedly mounted on the rotating shaft 32 of the stepping motor 25 and which meshes with a rack 36 formed on the valve shank.

The translating mechanism shown in FIG. 5 comprises a pulley 37 fixedly mounted on the rotating shaft 32 of the stepping motor 25 and carrying a length of wire 38 thereon which is connected to the valve 30.

Figure 7:
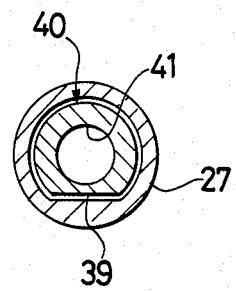
FIG. 7 is a cross section taken along the line VII—VII shown in FIG. 6.

The translating mechanism shown in FIG. 6 utilizes a valve 40 which is laterally formed with a flat 39 (see FIG. 7) on one side thereof to provide a detent and which is slidably received within the housing 27. The valve shank is formed with female threads 41 which engage male threads 42 formed on the rotating shaft 32 of the stepping motor 25.

It will be apparent that the flow control devices illustrated in FIGS. 4 to 7 achieve the similar function and effect as those achieved by the described flow control devices 16A, 16B.

It is to be noted that while a pair of flow control devices 16A, 16B are used in combination in each embodiment described above, the same function can be served by a single flow control device.

FIG. 8 shows that a single flow control device 16 having a construction as illustrated in FIGS. 2 to 7 is connected in tandem with a three way control valve 50 which is in turn in communication with a source of hydraulic pressure 51 and a drain 52. The flow control device 16 is connected to the pressure chamber 6. In this instance, the pressure chamber 5 is normally maintained in communication with the drain 52. The source of hydraulic pressure 51 may comprise an atmosphere or a source of compressed air while the drain 52 may be chosen to be the atmosphere or a source of negative pressure, in a manner corresponding to the choice of the source 51.

In this embodiment, when the brake booster is to apply a braking action, the controller 18 changes the flow paths of the three way control valve 50 so that the hydraulic fluid from the source 51 is supplied to the pressure chamber 6 through the control valve 50 and the flow control device 16. When the braking action by the brake booster is to be released, the flow path of the control valve 50 is switched by the controller 18 so that the hydraulic fluid from the pressure chamber 6 is drained to the drain 52 through the flow control device 16 and the valve 50.

In the same manner as mentioned above in connection with the previous embodiment, the channel area of the flow control device 16 is controlled by the controller 18 in accordance with the difference between the input and the output value. As in other embodiments, the control response can be designed differently when the hydraulic fluid is supplied than when it is drained.

Figure 10:
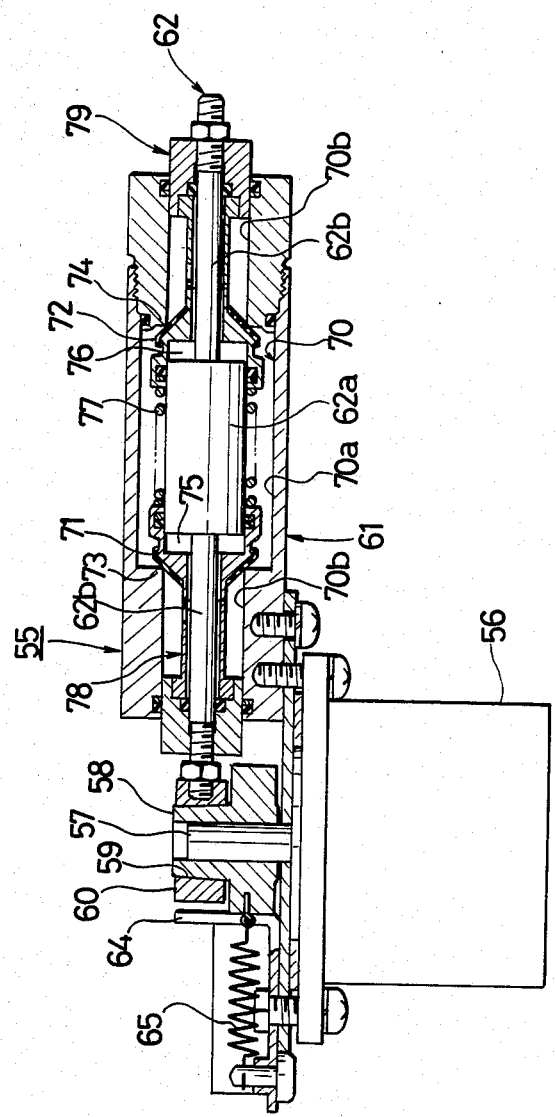
FIG. 10 is a longitudinal cross section of the embodiment shown in FIG. 9 in a condition different from that of FIG. 9.

FIGS. 9 and 10 show a further embodiment of the invention in which the three way control valve 50 may be dispensed with even though a single flow control device is used. In this embodiment, a flow control device 55 comprises an eccentric cam 58 fixedly mounted on the rotary shaft 57 of a stepping motor 56, a frame member 60 having a rectangular opening 59 therein which has a short side coincident with the diameter of the eccentric cam 58, and an operating rod 62 slidably fitted in a housing 61 and connected to the frame member 60. By rotating the eccentric cam 58 back and forth, such motion can be transmitted through the frame member 60 to cause a reciprocating movement of the operating rod 62. A outer peripheral surface of the eccentric cam 58 is formed a conical surface and a surface of the frame member 60 mating the conical surface is formed inclined surface so that both the surfaces are closely fitted by adjusting a mounted position of the eccentric cam 58 on the rotating shaft 57 of the stepping motor 56.

A pin 63 is fixedly mounted on the outer periphery of the eccentric cam 58, and a tension spring 65 has its one end engaged with the pin 63 while the other end of the spring 65 is anchored to a bracket 64 which is integrally mounted on the housing 61, thus urging the eccentric cam 58 to rotate clockwise, as viewed in FIG. 9. As a consequence, the frame member 60 is normally maintained in abutment against the bracket 64.

The housing 61 is internally formed with a bore 70 which includes a bore portion 70a of an increased diameter which centrally located within the bore and a pair of bore portions 70b of a reduced diameter which are located at the opposite ends of the bore. The operating rod 62 is slidably received within the bore 70 in axial alignment therewith and includes a central portion 62a of an increased diameter which is positioned within the bore portion 70a and a pair of end portions 62b of a reduced diameter. The pair of end portions 62b of the operating rod 62 slidably carry a pair of valves 71, 72, respectively, which are positioned within the bore portion 70a of an increased diameter. These valves 71, 72 are situated opposite to valve seats 73, 74, respectively, which are formed on steps between the bore portions 70a and 70b of different diameters.

The valves 71, 72 are integrally formed with respective cylindrical portions which extend toward each other and which are slidably fitted over the central portion 62a of the operating rod 62 while maintaining a fluid tightness therebetween by means of seal members, thus defining a pair of pressure chambers 75, 76 within the respective cylindrical portions. Each of the pressure chambers 75, 76 communicates with the exterior of the respective valve 71 or 72 through a clearance between each valve and the respective end portion 62b of the operating rod 62. A spring 77 is interposed between the cylindrical portions of the valves 71, 72 to urge the latter into seating engagement with the respective valve seats 73, 74.

The opposite ends of the operating rod 62 fixedly carry stop members 78, 79, respectively, which can be brought into abutment against the valves 71, 72, respectively. The stop members 78, 79 are slidably fitted into the bore portion 70b of a reduced diameter while maintaining a fluid tightness. The spacing between the inner ends of the both stop members 78, 79 is chosen to be equal to or slightly greater than the distance between the valve seats 73, 74. Each of the stop members 78, 79 has a cross-sectional area which is equal to the cross-sectional area of the central portion 62a of the operating rod 62. In addition, the area of each valve 71 or 72 which is subject to the pressure prevailing in the pressure chamber 75 or 76 is chosen substantially equal to the area thereof which is subject to the pressure on the opposite side when the valve is seated upon the valve seat 73 or 74.

Additionally, the housing 61 is formed with a flow path 80 located intermediate between the both valve seats 73, 74 and communicating with the pressure chamber 6, a flow path 81 located on the opposite side of the valve seat 73 from the flow path 80 and communicating with the source of hydraulic pressure 51, and a flow path 82 located on the opposite side of the valve seat 74 from the flow path 80 and communicating with the drain 52.

In this embodiment, when a controller including a microcomputer (not shown) is energized under the condition shown in FIG. 9, it controls the stepping motor 56 to bring the eccentric cam 58 and hence the operating rod 62 to a neutral position shown in FIG. 10 where the valves 71, 72 mounted on the operating rod 62 are both seated upon the valve seats 73, 74 simultaneously, thus interrupting a communication among the flow paths 80, 81 and 82.

At this time, pressure from the source 51 is admitted into the pressure chamber 75 through the clearance between the valve 71 and the end portion 62b of the operating rod 62. Since the cross-sectional area of the pressure-responsive area of the central portion 62a of the operating rod 62 is equal to the pressure-responsive area of the stop member 78, the hydraulic pressures acting upon the operating rod 62 can be balanced. At the same time, the hydraulic pressures acting upon the valve 71 can also be balanced since the pressure-responsive area of the valve toward the pressure chamber 75 is equal to the pressure-responsive area thereof on the opposite side when the valve 71 is seated upon the valve seat 73.

If, under this neutral condition, the stepping motor 56 is controlled to cause the eccentric cam 58 to rotate counter-clockwise, the operating rod 62 moves to the right, whereby the stop member 78 moves the left-hand valve 71 away from its valve seat 73 while maintaining the right-hand valve 72 seated upon the valve seat 74, thus establishing a communication between the flow paths 81, 80 to allow hydraulic fluid from the source 51 to be supplied to the pressure chamber 6.

Conversely, if the eccentric cam 58 is caused to rotate clockwise, the right-hand valve 72 may be moved away from the valve seat 74 while maintaining the left-hand valve 71 seated upon the valve seat 73, thus allowing hydraulic fluid to be drained from the pressure chamber 6 to the drain 52. It will thus be seen that a similar functioning as described in connection with previous embodiments is achieved.

When the controller is deenergized, the tension spring 65 returns the eccentric cam 58 to its position shown in FIG. 9, whereby the stepping motor 56 resumes its initial position.

It will be understood that the translating mechanism comprising the eccentric cam 58 and the frame member 60 shown in FIGS. 9 and 10 can be replaced by corresponding translating mechanisms illustrated in other embodiments.

While the invention has been illustrated and described in detail above in connection with several embodiments thereof, it should be understood that a number of changes, modifications and substitutions will readily occur to one skilled in the art without departing from the spirit and scope of the invention as defined by the appended claims.

What is claimed is:

1. A flow control device comprising a stepping motor having a shaft, a translating mechanism for translating the rotation of the stepping motor into a rectilinear movement, said translating mechanism including an eccentric cam integrally mounted on said shaft of said stepping motor and a frame member having an inner periphery engaging with the outer periphery of the eccentric cam, the outer periphery of the eccentric cam being a conical surface, the inner periphery of the frame member in contact with the conical surface being a tapered surface, an operating rod connected with the frame member and carrying a valve for reciprocatory movement of said valve in response to rotation of said stepping motor shaft, a valve seat disposed opposite to the valve, and a flow path including a clearance formed between the valve and the valve seat, the magnitude of the clearance between the valve and the valve seat being controlled in accordance with the amount of rotation of the stepping motor, thereby controlling the flow rate of a fluid passing through the flow path, said cam being axially adjustably mounted on said shaft for closely fitting said contacting tapered surface and conical surface.

2. The apparatus of claim 1 in which said frame member has a rectangular opening bounded by said inner periphery, said opening having a short side coincident with the diameter of the eccentric cam, said operating rod being slidably fitted in a housing containing the frame member.

3. The apparatus of claim 2 including a bracket fixedly mounted on the housing, means normally urging said eccentric cam in a direction to maintain the frame member in abutment against said bracket, said means comprising a pin fixedly mounted on the outer periphery of the eccentric cam and a tension spring having one end engaged with the pin and the other end thereof anchored to said bracket and thus resiliently urging the eccentric cam to rotate to a position wherein the frame member is in abutment against the bracket.

* * * * *